United States Patent
Klostermann et al.

(10) Patent No.: US 12,109,985 B2
(45) Date of Patent: Oct. 8, 2024

(54) ELECTROPNEUMATIC CONTROL MODULE (71) Applicant: ZF CV Systems Europe BV, Brussels (BE)

(72) Inventors: Thilo Klostermann, Barsinghausen (DE); Julian van Thiel, Grossburgwedel (DE)

(73) Assignee: ZF CV Systems Europe BV, Brussels (BE)

( * ) Notice: Subject to any disclaimer, the term of this patent is extended or adjusted under 35 U.S.C. 154(b) by 414 days.

(21) Appl. No.: 17/715,720

(22) Filed: Apr. 7, 2022

(65) Prior Publication Data

US 2022/0227342 A1 Jul. 21, 2022

Related U.S. Application Data (63) Continuation of application No. PCT/EP2020/080638, filed on Nov. 2, 2020.

(30) Foreign Application Priority Data

Nov. 14, 2019 (DE) ...................... 10 2019 130 762.7

(51) Int. Cl.
*B60T 13/38* (2006.01)
*B60T 8/17* (2006.01)
(Continued)

(52) U.S. Cl.
CPC .......... *B60T 13/385* (2013.01); *B60T 8/1708* (2013.01); *B60T 8/171* (2013.01); *B60T 13/683* (2013.01);
(Continued)

(58) Field of Classification Search
CPC .. B60T 13/385; B60T 13/683; B60T 2270/88; B60T 8/1708; B60T 2270/413;
(Continued)

(56) References Cited

U.S. PATENT DOCUMENTS

2011/0062774 A1   3/2011  Bensch et al.
2019/0248349 A1   8/2019  Wulf
(Continued)

FOREIGN PATENT DOCUMENTS

CN   109383478 A   2/2019
CN   109789868 A   5/2019
(Continued)

OTHER PUBLICATIONS

International Search Report of the European Patent Office dated Feb. 10, 2021 for international application PCT/EP2020/080638 on which this application is based.

(Continued)

*Primary Examiner* — Pamela Rodriguez
(74) *Attorney, Agent, or Firm* — Walter Ottesen, P.A.

(57) ABSTRACT

An electropneumatic control module has a trailer control unit, which has a trailer brake pressure port and a trailer feed pressure port, a holding brake unit, which has a spring-type actuator port and a holding brake pilot control unit, and an electronic control unit, which switches a holding brake pilot control unit into a ventilation position, wherein a second holding brake pilot control port is connected in pressure-conducting manner to a first holding brake pilot control port and the spring-type actuator port is connectable to a vent. The holding brake unit is connected to a redundancy port and is configured to output a first holding brake pressure at the spring-type actuator port when the holding brake pilot control unit is in the ventilation position and a redundancy pressure is provided. The trailer control unit outputs a brake pressure at the trailer brake pressure port when a redundancy pressure is provided.

23 Claims, 3 Drawing Sheets

(51) Int. Cl.
  *B60T 8/171*   (2006.01)
  *B60T 13/68*   (2006.01)
(52) U.S. Cl.
  CPC ..... *B60T 2270/413* (2013.01); *B60T 2270/88* (2013.01)
(58) Field of Classification Search
  CPC .......... B60T 8/171; B60T 13/662; B60T 7/20; B60T 15/181
  See application file for complete search history.

(56) References Cited

U.S. PATENT DOCUMENTS

| | | |
|---|---|---|
| 2020/0023820 A1 | 1/2020 | Van Thiel |
| 2020/0070795 A1 | 3/2020 | Van Thiel |
| 2020/0079341 A1 | 3/2020 | Van Thiel |
| 2020/0139952 A1 | 5/2020 | Van Thiel |
| 2020/0189545 A1* | 6/2020 | Bensch ................. B60T 13/662 |
| 2021/0070272 A1* | 3/2021 | Van Thiel ............. B60T 15/027 |
| 2024/0109524 A1* | 4/2024 | Klostermann ........ B60T 13/261 |

FOREIGN PATENT DOCUMENTS

| | | |
|---|---|---|
| CN | 110431054 A | 11/2019 |
| CN | 110446636 A | 11/2019 |
| DE | 10 2008 021 822 B3 | 4/2009 |
| DE | 10 2008 014 547 A1 | 9/2009 |
| DE | 10 2017 002 716 A1 | 9/2018 |
| DE | 10 2017 006 356 A1 | 9/2018 |
| WO | 2016/169973 A1 | 10/2016 |
| WO | 2016/169975 A1 | 10/2016 |
| WO | 2018/172394 A1 | 9/2018 |

OTHER PUBLICATIONS

Translation and Written Opinion of the International Searching Authority dated Feb. 10, 2021 for international application PCT/EP2020/080638 on which this application is based.

* cited by examiner

ELECTROPNEUMATIC CONTROL MODULE

CROSS REFERENCE TO RELATED APPLICATIONS

This application is a continuation application of international patent application PCT/EP2020/080638, filed Nov. 2, 2020 designating the United States and claiming priority from German application 10 2019 130 762.7, filed Nov. 14, 2019, and the entire content of both applications is incorporated herein by reference.

TECHNICAL FIELD

The disclosure relates to an electropneumatic control module for an electronically controllable pneumatic brake system of a vehicle, in particular utility vehicle, having a pneumatic supply port, which can be connected to a compressed air supply for the purposes of receiving a supply pressure, a trailer control unit, which has a trailer control valve unit with one or more electropneumatic valves, a trailer brake pressure port and a trailer feed pressure port, a holding brake unit, which has a spring-type actuator port for at least one spring-type actuator of the vehicle and has a holding brake pilot control unit with one or more electropneumatic valves, wherein a first holding brake pilot control port of the holding brake pilot control unit is connected to a vent, and having an electronic control unit, wherein the electronic control unit is configured to cause the holding brake unit to switch the holding brake pilot control unit into a ventilation position in response to the receipt of an electronic holding signal, wherein, in the ventilation position, a second holding brake pilot control port is connected in pressure-conducting fashion to the first holding brake pilot control port and the second spring-type actuator port is connectable to one of two vents.

BACKGROUND

In brake systems for vehicles that are configured for towing a trailer, the brake system has a trailer control unit, which is also referred to as a trailer control valve (TCV) and which is provided for pneumatically outputting the vehicle setpoint decelerations, which are specified by the vehicle, correspondingly also via ports, namely a trailer brake pressure port and a trailer feed pressure port. The trailer brake pressure port is also referred to as red coupling head, whereas the trailer feed pressure port is also referred to as yellow coupling head. The trailer or its brake system is supplied with a supply pressure, from a supply provided for this purpose in the towing vehicle, via the trailer feed pressure port, whereas the corresponding brake pressure is controlled via the trailer brake pressure port.

Brake systems of the above generic type have a holding brake unit, also referred to as an electropneumatic handbrake (EPH), as a further component or module. Such holding brake units are commonly operated with so-called spring-type actuators, that is, brake devices that brake one or more axles of the vehicle on the basis of a spring force. The brakes are released when pressurized, and are braked when ventilated. In an unpressurized state, the corresponding vehicle is thus braked. To activate the holding brake unit, an electrical switch is generally provided in the driver's cab of the vehicle, via which electrical switch a corresponding signal can be output to an electronic control unit, which then switches one or more electropneumatic valves such that the spring-type actuators are either ventilated or pressurized.

The holding brake unit, that is, the electropneumatic handbrake, is used for parking the vehicle or vehicle combination, but also as an additional brake in special situations. This means that, in addition to the normal service braking action, the spring-type actuators are at least partially ventilated in order for these to be additionally or alternatively used for braking.

Brake cylinders of the vehicle are commonly configured as double-acting brake cylinders. They have the task of generating the required braking forces for both the service brake and the holding brake system and, for this purpose, have several chambers that can be pressurized. The force of the double-acting brake cylinder is in this case generally transmitted to the corresponding wheel brake via a common actuating unit. If the service brake system and parking brake system are actuated at the same time, an addition of braking force occurs at the actuating unit and/or the wheel brake. This can result in overloading of and/or damage to the actuating unit and/or the wheel brake. Furthermore, if excessive braking forces are used, there is a risk of a loss of control of the vehicle, for example owing to locking wheels. If this is to be prevented, an overload protection function, which is also referred to as an anti-compounding function, must be provided.

In order for a movement of the vehicle to be prevented with a high degree of certainty when the vehicle is parked, it is furthermore desirable for the trailer to also be braked. Since the brake cylinders of trailers often do not have spring-type actuators, a positive brake pressure must be permanently provided to the brake cylinders of the trailer when the trailer is parked. In an unpressurized state, the trailer is movable, and in a pressurized state, the trailer is braked. The application of the braking force thus behaves inversely in the trailer and in the vehicle. In order to pneumatically output a corresponding brake signal for the trailer also, a so-called inverse relay valve is generally used, which outputs an increasing pressure for the trailer on the basis of a decreasing pressure in the spring-type actuators of the vehicle. Such inverse relay valves are of complex construction and commonly have multiple control pistons that interact with one another via different control surfaces and different control chambers, and are associated with high costs. Furthermore, it may also be provided that, as disclosed by the present applicant in US 2020/0079341, a parking brake valve unit having a pneumatically controlled switching valve is provided, which has a pneumatic control inlet for receiving a pneumatic control pressure. When a spring-type actuator port of the vehicle is connected to a pressure sink, the pneumatically controlled switching valve is switched such that a brake pressure can be output at the trailer brake pressure port. A disadvantage here is that, in order to implement an overload protection function, further pneumatic ports and/or additional lines have to be provided, which make the system more complicated and result in increased costs.

US 2020/0023820 discloses an electronically controllable brake system with a trailer control valve, which has a trailer control module, wherein the trailer control module is configured to receive and process an electronically transmitted braking specification, and the trailer control valve is configured to, in a manner controlled by the trailer control module, generate and output a redundancy control pressure in a manner dependent on the electronically transmitted braking specification, wherein, if an implementation of the braking specification, in a manner electrically controlled by a service brake control module, by way of at least one service brake circuit through the outputting of a service-brake brake pressure is prevented, the service-brake brake pressure can be generated, and output to the service brakes of the at least one service brake circuit, in a manner dependent on the redundancy control pressure generated in the trailer control valve, and/or a trailer control pressure can be generated, and output to a trailer, in a manner dependent on the redundancy control pressure generated in the trailer control valve. In order to prevent superposed braking owing to the simultaneous actuation of the service brakes and the spring brakes, it is proposed to provide corresponding open-loop and closed-loop control in a parking brake control module of the electronically controllable brake system. However, a cost-effective implementation of the overload protection function is not disclosed.

SUMMARY

It is an object of the present disclosure to specify an electropneumatic control module and an electronically controllable brake system having such a control module, which provides an overload protection function while being of simplified construction. A further object of the disclosure provides specifying a vehicle which has an electronically controllable brake system with such a control module.

The disclosure, for example, achieves the object, in the case of an electropneumatic control module of the type mentioned in the introduction, in that the holding brake unit is connected in pressure-conducting fashion to a redundancy port and is configured to, instead of a connection of the spring-type actuator port to the vent, output a first holding brake pressure at the spring-type actuator port if the holding brake pilot control unit is situated in the ventilation position and a redundancy pressure is provided at the redundancy port, wherein the trailer control unit is configured to output a brake pressure at the trailer brake pressure port if a redundancy pressure is provided at the redundancy port.

In the electropneumatic control module according to a first aspect of the disclosure, the redundancy port thus performs a dual function. Firstly, a brake pressure can be controlled at the trailer brake pressure port via the redundancy pressure provided at the redundancy port, and secondly, an overload protection function is implemented. The overload protection function includes that, in the presence of a redundancy pressure, a holding brake pressure is output at the spring-type actuator port even when the holding brake pilot control unit is situated in the ventilation position. In contrast, if no redundancy pressure is provided, a spring-type actuator that is fluidically connected to the spring-type actuator port is ventilated. An overload protection function and a redundancy function can thus be implemented with only one port, the redundancy port, and one port on the electropneumatic control module can be eliminated. This simplifies a construction of the electropneumatic control module, and the costs thereof can be reduced.

The outputting of a brake pressure at the trailer brake pressure port in the event that a redundancy pressure is provided is desirable, for example, if a user wishes to impart a braking demand or if there is a fault in the electrical system. For example, the electronic control unit may have a fault, or a voltage supply of the electropneumatic control module may be interrupted. The electropneumatic control module is preferably configured to output a brake pressure at the trailer brake pressure port if there is a fault in the electronic control unit, in one or more electropneumatic valves and/or in a voltage supply of the electropneumatic control module. In this way, the safety of a vehicle equipped with an electropneumatic control module according to the disclosure can be increased.

The overload protection function, also referred to as anti-compounding function, ensures that an actuating unit of a brake cylinder and/or a wheel brake is not fully actuated simultaneously by a spring-type actuator of the brake cylinder, which is connected to the spring-type actuator port, and a service brake cylinder. A spring-type actuator connected to the holding brake pilot control port is preferably ventilated when the holding brake pilot control unit is situated in a ventilation position and no redundancy pressure is provided. In this way, the force of the spring-type actuator is transmitted to the actuating unit of the brake cylinder and to a wheel brake connected thereto. If a redundancy pressure is now provided at the redundancy port, then the holding brake pilot control port is not connected to the vent, but rather a holding brake pressure is output, which at least partially counteracts the force of the spring-type actuator. The first holding brake pressure preferably corresponds to the redundancy pressure. However, it may also be provided that the holding brake pressure is proportional to the redundancy pressure.

In a first embodiment, the holding brake unit is configured to output the first holding brake pressure only if the holding brake pilot control unit is situated in the ventilation position, and to output the supply pressure if the holding brake pilot control unit is switched into an open position. The holding brake pilot control unit can thus be switched at least between a ventilation position and an open position. It should be understood that the holding brake pilot control unit may also have further switching positions, and/or that a pressure output by the holding brake pilot control unit in the open position can be modulated. The supply pressure preferably corresponds to a maximum pressure of the system. Furthermore, spring-type actuators connected to the spring-type actuator port are preferably fully pressurized when the supply pressure is output.

The spring-type actuator port is preferably connected to the vent if no redundancy pressure is provided at the redundancy port and the holding brake pilot control unit is situated in the ventilation position. The holding brake unit therefore preferably has a control function for the pressure provided at the spring-type actuator port. If the holding brake pilot control unit is situated in the ventilation position, the spring-type actuator port is either connected to the vent, or a first holding brake pressure is output. If the holding brake pilot control unit is now switched into the open position, the supply pressure is output at the spring-type actuator port, preferably even when a redundancy pressure is provided at the redundancy port. For parking of the vehicle, the holding brake pilot control unit is switched into the ventilation position. If, in this case, no redundancy pressure is provided at the redundancy port, the spring-type actuator port is connected to the vent and the spring-type actuator(s) of the vehicle is/are ventilated, such that the vehicle is braked. If a redundancy pressure is now provided at the redundancy port, then the first brake pressure is provided at the spring-type actuator port and the spring brake is thus at least partially released.

In an embodiment, the holding brake unit furthermore has a shuttle valve with a first shuttle valve port, a second shuttle valve port and a third shuttle valve port, wherein the first shuttle valve port is connected to the redundancy port for the purposes of receiving the redundancy pressure, the second shuttle valve port is connected to the holding brake pilot control unit for the purposes of receiving a pilot control pressure, and wherein the shuttle valve is configured to provide in each case the higher out of the redundancy pressure and the pilot control pressure at the third shuttle valve port. The shuttle valve, which is also referred to as a select-high valve, thus performs a selection function between the redundancy pressure and the pilot control pressure, which is provided by the holding brake pilot control unit. If a pressure prevails both at the first shuttle valve port and at the second shuttle valve port, the respectively higher pressure is output. The shuttle valve is preferably configured as a double check valve, wherein flow can pass through the double check valve only from the first shuttle valve port to the third shuttle valve port or from the second shuttle valve port to the third shuttle valve port. The selection function described above can be achieved in a particularly simple manner via a shuttle valve. The pilot control pressure is provided by the holding brake pilot control unit and may correspond to a pressure level of the vent, to the supply pressure and particularly preferably also to pressures lying between the pressure level of the vent and the supply pressure.

In an embodiment, the holding brake unit furthermore has a first relay valve, which has a control port connected to the third shuttle valve port and has a working port connected to the spring-type actuator port. Relay valves are generally configured to provide, at the working port, a pressure that is proportional to a control pressure provided at the control port. In this case, a pressure provided at a supply port is modulated so as to be proportional to the control pressure. According to this embodiment, a pressure output at the working port is therefore proportional to the redundancy pressure or to the pilot control pressure of the pilot control unit. If a control pressure provided at the control port corresponds to the pressure level of the vent, the working port of the relay valve and thus also the spring-type actuator port are connected in pressure-conducting fashion to a ventilation port of the relay valve. This may be the case for example if the holding brake pilot control unit is situated in the ventilation position and no redundancy pressure is provided at the redundancy port.

In one variant, the electropneumatic control module furthermore has a parking brake valve unit with a first pneumatically controlled switching valve which has a pneumatic control port for receiving a first pneumatic control pressure, wherein, when the spring-type actuator port is connected to the vent, the first pneumatically controlled switching valve is switched such that the supply pressure can be output at the trailer brake pressure port. A pneumatically controlled switching valve has the advantage that it can be switched even without energization. The first pneumatically controlled switching valve preferably has a first and a second switching position, wherein the first pneumatically controlled switching valve is switched into the first switching position when a first pneumatic control pressure is provided at the first pneumatic control port. The first pneumatically controlled switching valve is preferably preloaded into the second switching position, for example via a spring.

According to an embodiment, the first pneumatic control pressure is the pressure at the spring-type actuator port. If the spring-type actuator port is connected to the vent, spring-type actuators connected to the spring-type actuator port are ventilated, and the vehicle is braked. At the same time, the first pneumatically controlled switching valve is switched into the second switching position, such that a brake pressure is output at the trailer brake pressure port and a trailer connected to the vehicle is braked. By using the first pneumatically controlled switching valve, a simple construction can thus be achieved, which makes it possible to omit an inverse relay valve. A particularly simple, inexpensive and/or robust construction is hereby achieved. It is also the case that no further electropneumatic valve is required for this.

The first pneumatically controlled switching valve is preferably configured as a pneumatically controlled 3/2 directional valve with a first port, a second port and a third port. 3/2 directional valves are common switching valves that have three ports and two switching positions. Here, in the second switching position, the second port and the third port are connected, and the first port is closed. In the first switching position, the first and third ports are fluidically connected, and the second port is closed.

In an embodiment, the first port of the pneumatic 3/2 directional valve is connected to the redundancy port and the second port of the pneumatic 3/2 directional valve is connected to the supply port. A redundancy pressure can thus be output at the third port of the 3/2 directional valve if a first control pressure is provided at the pneumatic control port. Since the first control pressure corresponds to the pressure at the spring-type actuator port, this is the case when the spring-type actuators of a vehicle are at least partially pressurized. If the spring-type actuator port is connected to the vent, the first pneumatic control pressure corresponds to the pressure level of the vent, such that the first pneumatically switched switching valve is switched to the second switching position. In the second switching position, supply pressure is then provided at the third port of the 3/2 directional valve.

In a further embodiment, the third port of the pneumatically controlled 3/2 directional valve is connected to a redundancy valve of the trailer control valve unit of the trailer control unit. The redundancy valve of the trailer control valve unit is preferably an electronically controllable switching valve, in particular an electronically controllable 2/2 directional valve, which is open in a deenergized switching position. For example, the redundancy valve may be configured as a solenoid valve that is preloaded into the open switching position via a spring. The pressure provided at the redundancy valve is dependent here on the first pneumatic control pressure, which corresponds to the pressure at the spring-type actuator port. When the spring-type actuator port is connected to the vent, a supply pressure is provided at the redundancy valve. By contrast, if a pressure is output at the spring-type actuator port, then a redundancy pressure is provided at the redundancy valve. A brake pressure provided at the brake pressure port is preferably proportional to the pressure provided at the redundancy valve. It can thus advantageously be achieved that, for the purposes of braking a trailer, a supply pressure is provided at the brake pressure port when the spring-type actuator port is connected to the vent and the spring brakes are engaged. When a holding brake pressure is output at the spring-type actuator port, then the pneumatically controlled 3/2 directional valve switches to the first switch position, such that a redundancy pressure can be provided at the redundancy valve. It may also be provided that the redundancy valve is adapted to modulate a brake pressure that is provided at the trailer control port.

In a second variant, the trailer control valve unit of the trailer control unit has a redundancy valve, wherein the redundancy port is pneumatically connected to a redundancy valve port. Here, the redundancy port is thus permanently connected in fluid-conducting fashion to the redundancy valve. According to this variant, too, the redundancy valve is preferably configured as an electronically controllable directional valve, particularly preferably as a 2/2 directional valve, which is normally open.

According to an embodiment, the electropneumatic control module furthermore has a parking brake valve unit, wherein the electronic control unit is configured to cause the parking brake valve unit, on the basis of an electronic holding signal, to switch at least one valve of the parking brake valve unit such that a pneumatic connection between the trailer feed pressure port and the supply port is interrupted. This is desirable in particular in brake systems for the North American or Scandinavian markets, where trailers are often equipped with spring-type actuators which brake the trailer when ventilated. Furthermore, owing to legal regulations in the USA, the trailer feed pressure port and the trailer brake pressure port are configured to be open, such that it is necessary for an evacuation of the compressed-air supply to be prevented when no trailer is connected. The pneumatic connection is particularly preferably interrupted when the parking brake valve unit is deenergized. The parking brake valve unit is preferably configured to connect the trailer feed pressure port to the or a vent when the pneumatic connection of the trailer feed pressure port to the supply port is interrupted.

According to an embodiment, the parking brake valve unit has a second pneumatically controlled switching valve which has a second pneumatic control port for receiving a second pneumatic control pressure, wherein, if the second control pressure undershoots a second limit pressure, the second pneumatically controlled switching valve is switched such that the pneumatic connection between the trailer feed pressure port and the supply port is interrupted. Via pneumatic control, switching of the second pneumatic switching valve can be ensured even when the parking brake valve unit is deenergized. The second limit pressure preferably represents a switching threshold, wherein the second pneumatically controlled switching valve is switched when the switching threshold is overshot. The second control port is preferably connected to a first electronically controllable switching valve of the parking brake valve unit. The first electronically controllable switching valve is preferably configured as a 3/2 directional valve, wherein a first port of the 3/2 directional valve is connected to the control port. Preferably, in a first switching position, the first port of the 3/2 directional valve is connected via a throttle to the trailer feed pressure port. In a second switching position, the first port of the 3/2 directional valve is preferably connected to the vent, such that the pneumatic control module interrupts a connection between the trailer feed pressure port and the supply port when the 3/2 directional valve is switched to the second switching position. The 3/2 directional valve is preferably preloaded into the first switching state via a spring. If the trailer feed pressure port is ventilated, as may be the case for example if a leak occurs in a trailer brake circuit, then the pressure at the second pneumatic control port of the second pneumatically controlled switching valve decreases. Owing to the throttle, the pressure falls only slowly, such that the trailer feed pressure port is initially still connected to the supply port. If necessary, compressed air can be sufficiently replenished via the supply port to compensate for the pressure drop at the trailer feed pressure port. If the pressure at the trailer feed pressure port falls too low owing to a leak, then the second control pressure undershoots the limit pressure, and the connection between the supply port and the trailer feed pressure port is interrupted.

In a further embodiment, the second pneumatically controlled switching valve is configured as a pneumatically controlled 3/2 directional valve with a second port, a third port and a fourth port, wherein the second port is connected to the trailer feed pressure port, the third port is connected to the supply port, and the fourth port is connected to a or the vent. The pneumatically controlled 3/2 directional valve thus preferably has two switching positions, wherein, in a first switching position, the trailer feed pressure port connected to the second port is connected to the vent. The pneumatically controlled 3/2 directional valve is preferably preloaded into the second switching position. In a deenergized state of the second electropneumatic control module, the pneumatically controlled 3/2 directional valve is therefore preferably switched into the second switching position. In the second switching position, the supply port connected to the third port is fluidically connected to the second port and thus to the trailer feed pressure port.

The trailer control unit preferably has a third pneumatically controlled switching valve which has a third pneumatic control port for receiving a third pneumatic control pressure, wherein the third pneumatic control port of the third pneumatically controlled switching valve is connected in pressure-conducting fashion to the second pneumatic control port of the second pneumatic switching valve. Owing to the connection of the control ports of the second and third control ports, the second and third pneumatically controlled switching valves can be switched via a single control pressure.

In an embodiment, the third pneumatically controlled switching valve is configured to provide a trailer control pressure at the trailer brake pressure port if the control pressure overshoots a third limit pressure. The third limit pressure preferably corresponds to the second limit pressure. However, it should be understood that the third limit pressure for switching the third pneumatically controlled switching valve may differ from the second limit pressure. The third pneumatically controlled switching valve preferably interrupts a connection of the trailer control unit to the trailer brake pressure port when the third control pressure is lower than the third limit pressure. The third control pressure preferably falls below the third limit pressure when a pressure at the trailer feed pressure port corresponds to the pressure level of the vent. In this way, it is possible to prevent a brake pressure from being output at the trailer brake pressure port when no supply pressure is provided at the trailer feed pressure port. This function is also referred to as a tractor protection function.

According to an embodiment, the electronic control unit, the trailer control unit and the holding brake unit are integrated in one module. Provision may also be made for individual components, that is, the electronic control unit, the trailer control unit and/or the holding brake unit, to be in the form of sub-modules that are connectable to one another. By integrating the components in one module, the assembly process in particular is significantly simplified, whereby assembly costs can be saved.

The electropneumatic control module particularly preferably has a common housing in which at least the components of the electronic control unit, the trailer control unit and the holding brake unit are arranged. Assembly and/or production costs for the electropneumatic control module can be further reduced via a common housing. Furthermore, the complexity of an associated brake system can be reduced by way of a modular configuration and/or a common housing. For example, the risk of incorrectly connecting the electropneumatic control module during the assembly process is reduced.

According to a second aspect, the disclosure achieves the object stated in the introduction via an electronically controllable pneumatic brake system for a vehicle, in particular utility vehicle, having a front axle brake circuit for a front axle of the vehicle, which has a front axle modulator and front axle service brake cylinders, a rear axle brake circuit for at least one rear axle of the vehicle, which has a rear axle modulator and rear axle service brake cylinders, a trailer brake circuit, a central control unit which is configured to provide at least one control signal to the rear axle modulator and/or to the front axle modulator, and an electropneumatic control module according to one of the above-described embodiments according to the first aspect. With regard to the features of the electropneumatic control module, reference is made to the above explanations relating to the first aspect of the disclosure in their entirety. The front axle modulator is configured to provide a front axle brake pressure at the front axle service brake cylinders. The rear axle modulator is analogously configured to provide a rear axle brake pressure at the rear axle service brake cylinders. However, provision may also be made for one or more ABS control modules for an anti-lock brake system to be arranged between the front axle modulator and the front axle service brake cylinders and/or the rear axle modulator and the rear axle service brake cylinders. Such ABS control modules are known to a person skilled in the art from the relevant prior art. The electronically controllable pneumatic brake system preferably has a brake signal transmitter. The brake signal transmitter may be an electric brake pedal, which is configured to provide an electronic braking specification to the central control unit. Furthermore, the brake signal transmitter may also be a pneumatic brake signal transmitter for providing a pneumatic braking specification.

In a first embodiment of the electronically controllable pneumatic brake system, the redundancy port of the electropneumatic control module is pneumatically connected to the front axle modulator, to the rear axle modulator and/or to a manually actuatable brake signal transmitter. In this way, a front axle brake pressure, a rear axle brake pressure and/or a manually specified brake pressure can be used as redundancy pressure.

The redundancy pressure is particularly preferably a front axle brake pressure that is provided by the front axle modulator for the purposes of braking wheels of the front axle. If the service brakes of the rear axle cannot be used owing to a fault in the rear axle brake circuit, the use of the front axle brake pressure as redundancy pressure allows the wheels of the rear axle to be braked via the spring brakes. In this way, redundancy for the rear axle brake circuit can advantageously be achieved.

Provision may also be made for the redundancy pressure to be a front axle control pressure that is provided at the front axle modulator by the brake signal transmitter. Here, too, redundancy of the rear axle brake circuit is realized, wherein it is additionally achieved that the redundancy pressure is independent of a functionality of the front axle modulator. Furthermore, in a redundancy situation, the wheels of the front axle can be braked independently of the wheels of the rear axle.

In a third aspect, the disclosure achieves the object mentioned in the introduction via a vehicle, in particular a utility vehicle, with an electronically controllable pneumatic brake system according to the second aspect of the disclosure.

BRIEF DESCRIPTION OF THE DRAWINGS

The invention will now be described with reference to the drawings wherein.

DESCRIPTION OF THE PREFERRED EMBODIMENTS

Figure 1:
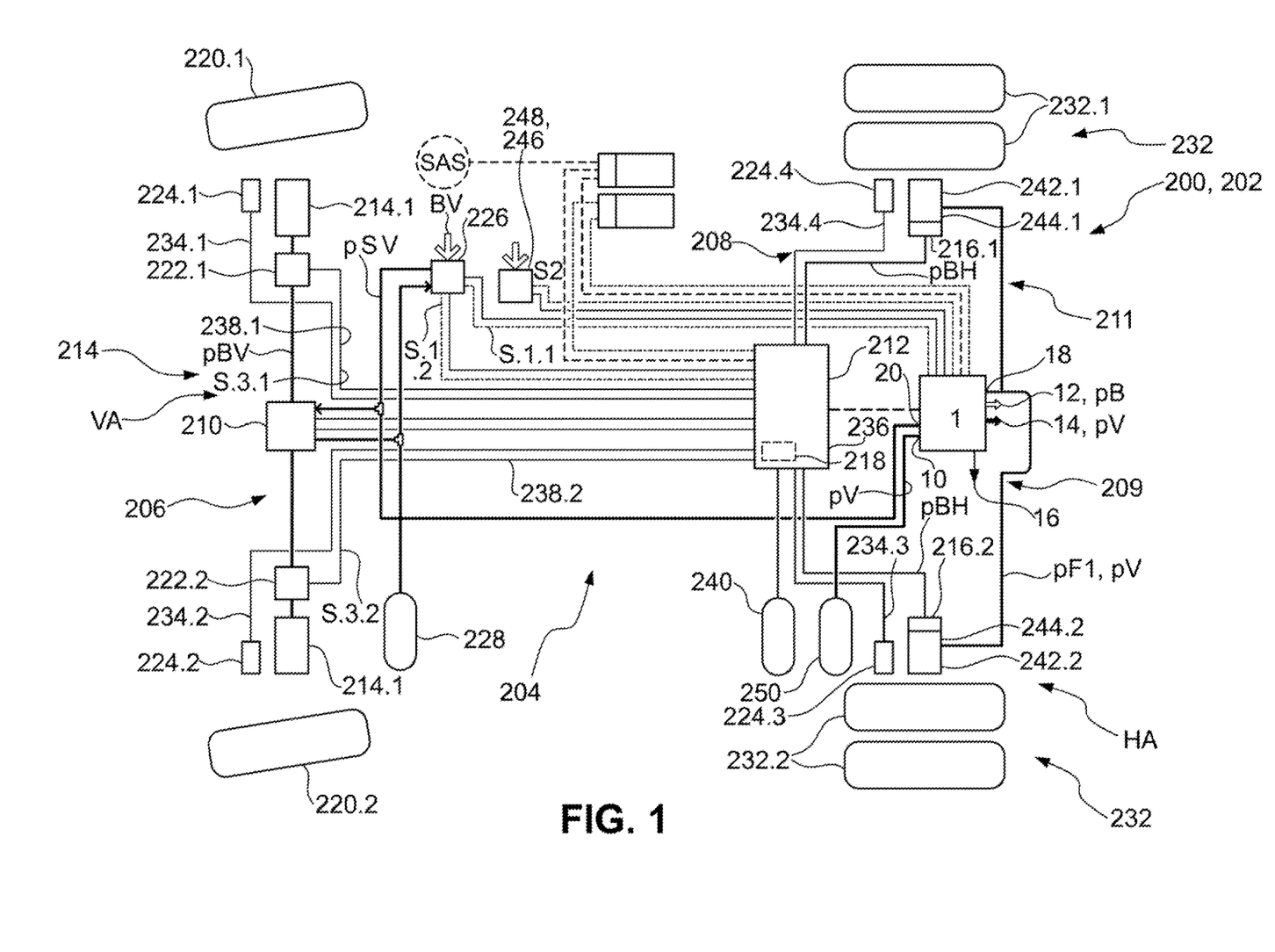
FIG. 1 is a schematic illustration of a vehicle with an electronically controllable pneumatic brake system which has an electropneumatic control module.

A vehicle 200, in particular a utility vehicle 202, has an electronically controllable pneumatic brake system 204 (FIG. 1). The electronically controllable brake system 204 has in this case a front axle brake circuit 206, a rear axle brake circuit 208 and a trailer brake circuit 209. The front axle brake circuit 206 has a front axle modulator 210, which is configured to output a front axle brake pressure pBV for front axle service brake cylinders 214.1, 214.2. A first front axle service brake cylinder 214.1 is configured to brake a right front wheel 220.1 and the second service brake cylinder 214.2 is configured to brake a left front wheel 220.2 of a front axle VA of the vehicle 200. Furthermore, the front axle brake circuit 206 in this case has ABS modules 222.1, 222.2, which are configured to modulate the front axle brake pressure pBV, such that the front wheels 220 can be braked individually. Wheel rotational speed sensors 224.1, 224.2 are also provided for ascertaining a wheel rotational speed of the front wheels 220. In this embodiment, the electronically controllable pneumatic brake system 204 furthermore has a manually actuatable brake signal transmitter 226, wherein the brake signal transmitter 226 is configured to provide a front axle control pressure pSV that is proportional to a braking specification BV. A first compressed air supply 228 supplies compressed air both to the front axle modulator 210 and to the brake signal transmitter 226. Here, the brake signal transmitter 226 is a partially electrical brake signal transmitter 230, which, in addition to the front axle control pressure pSV, also provides control signals S1.1, S1.2 that are proportional to the braking specification BV.

The rear axle brake circuit 208 is provided for braking right rear wheels 232.1 and left rear wheels 232.2 of the rear axle HA of the vehicle 200. In this embodiment, the vehicle 200 has a total of four rear wheels 232.1, 232.2, 232.3, 232.4. It should be understood that the vehicle 200 may also have only two rear wheels 232. Furthermore, provision may also be made for the vehicle 200 to have a second rear axle (not illustrated), wherein the rear axle brake circuit 208 is preferably configured to brake the rear wheels 232 of both rear axles HA. To brake the rear wheels 232, the rear axle brake circuit 208 has rear axle service brake cylinders 216.1, 216.2, wherein a rear axle modulator 212 of the rear axle brake circuit 208 provides a rear axle brake pressure pBH at the rear axle service brake cylinders 216.1, 216.2. Here, the rear axle service brake cylinders 216.1, 216.2 are connected, without ABS modules, to the rear axle modulator 212. However, provision may also be made for the rear axle brake circuit 208 to include ABS modules. Wheel rotational speed sensors 224.3, 224.4 are provided for determining the rotational speed of the rear wheels 232. The wheel rotational speed sensors 224.1, 224.2, 224.3, 224.4 are connected via signal lines 234.1, 234.2, 234.3, 234.4 to a central control unit 218 of the electronically controllable pneumatic brake system 204, and provide wheel rotational speed data to the central control unit 218. To control the ABS modules 222.1, 222.2, the central control unit 218 is connected via control lines 238.1, 238.2 to the ABS modules 222.1, 222.2 and provides ABS signals S3.1, S3.2. Here, the control unit 218 and the rear axle modulator 212 are implemented as a combined module 236. An embodiment as a combined module 236 allows simplified assembly and cost savings. It should be understood that the central control unit 218 and the rear axle modulator 212 may also be implemented as separate modules. A second compressed air supply 240 supplies the rear axle brake circuit 208 with compressed air. Here, the rear axle brake circuit 208 is electronically controllable, wherein the rear axle modulator 212 modulates the rear axle brake pressure pBH on the basis of rear axle control signals (not illustrated) from the central control unit 218. The rear axle control signals are based here on the control signal S1.2 that is provided by the brake signal transmitter 226 to the central control unit 218. However, provision may also be made for the control signal S1.2 of the brake signal transmitter 226 to be provided directly to the rear axle modulator 212, and for the rear axle modulator to be configured to modulate the rear axle brake pressure pBH using the control signal S1.2.

In this embodiment, the rear axle service brake cylinders 216.1, 216.2 and spring-type actuators 242.1, 242.2 of the rear axle HA are combined in double-acting brake cylinders 244.1, 244.2. The spring-type actuators 242.1, 242.2 are assigned to a parking brake circuit 211 and are connected to a spring-type actuator port 18 of an electropneumatic control module 1. To release the spring-type actuators 242.1, 242.2, the electropneumatic control module 1 outputs a first holding brake pressure pF1 or a supply pressure pV at the spring-type actuator port 18 and thus pressurizes the spring-type actuators 242.1, 242.2. Furthermore, the electropneumatic control module 1 is configured to ventilate the spring-type actuators 242.1, 242.2 via the spring-type actuator port 18, such that the rear wheels 232 are braked via the spring-type actuators 242.1, 242.2. This preferably occurs when a parking brake switch 246 is actuated. It should be understood that the parking brake switch 246 encompasses all types of actuating devices, such as pushbuttons or levers. Here, the parking brake switch 246 is an electronic switch 248 which, in response to being actuated by a user, provides an electronic holding signal S2 to the electropneumatic control module 1.

Furthermore, the electropneumatic control module 1 is also assigned to a trailer brake circuit 209 and is configured to output a brake pressure pB at a trailer brake pressure port 12 and a supply pressure pV at a trailer feed pressure port 14. The trailer brake pressure port 12 and the trailer feed pressure port 14 are provided for the connection of a trailer (not illustrated). For the supply of supply pressure pV, a supply port 10 of the electropneumatic control module 1 is connected in pressure-conducting fashion to a third compressed air supply 250. An electronic control unit ECU (not illustrated in FIG. 1, cf. FIGS. 2 and 3) of the electropneumatic control module 1 is preferably connected to the central control unit 218. Furthermore, the electropneumatic control module 1 has a redundancy port 20 which is connected here in pressure-conducting fashion to the brake signal transmitter 226, wherein the brake signal transmitter 226 provides the front axle control pressure pSV at the redundancy port 20. Provision may however also be made for the redundancy port 20 to be connected in pressure-conducting fashion to the rear axle modulator 212, wherein the rear axle modulator provides the rear axle brake pressure pBH at the redundancy port 20. The front axle modulator 210 may likewise preferably be connected in pressure-conducting fashion to the redundancy port 20 and provide the front axle brake pressure pBV there.

Furthermore, the electropneumatic control module 1 has a vent 16 which, in this case, is open to the environment. Altogether, the electropneumatic control module 1 has six ports, namely the supply port 10, the trailer brake pressure port 12, the trailer feed pressure port 14, the vent 16, the spring-type actuator port 18 and the redundancy port 20. However, provision may also be made for the electropneumatic control module 1 to have multiple spring-type actuator ports 18.

Figure 2:
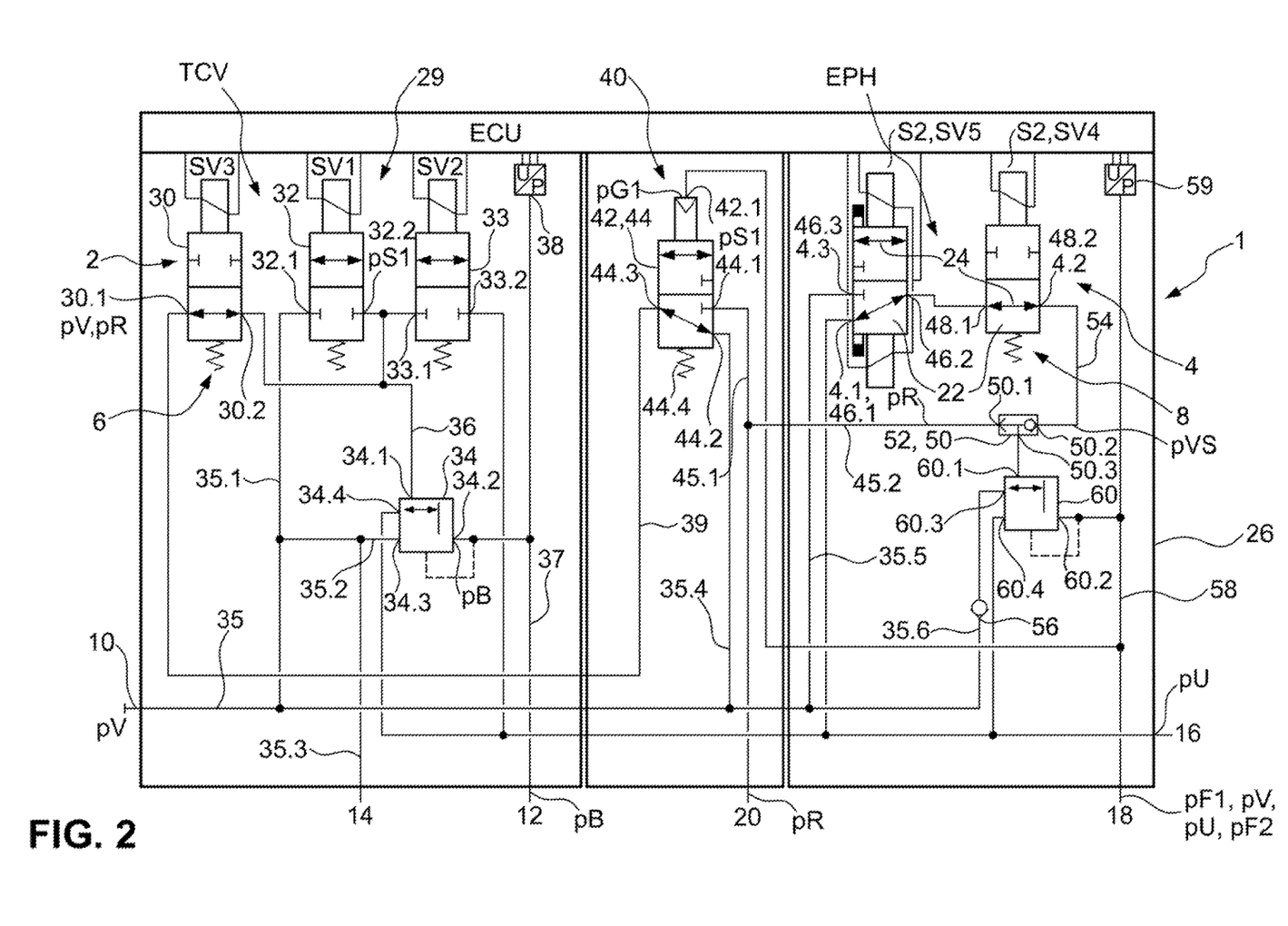
FIG. 2 shows an electropneumatic control module according to a first embodiment; and, FIG. 3 shows an electropneumatic control module according to a second embodiment.

FIG. 2 shows a first embodiment of the electropneumatic control module 1, which has a trailer control unit TCV, a holding brake unit EPH and a parking brake valve unit 40. The trailer control unit TCV, the holding brake unit EPH and the parking brake valve unit 40 are in this case integrated into a common housing 26. The trailer control unit TCV, which is also referred to as trailer control valve, and the holding brake unit EPH are configured here to be electronically controllable, and are connected to the electronic control unit ECU. The parking brake valve unit 40 has a first pneumatically controlled switching valve 42, which can be controlled via a first control pressure pS1 provided at a first pneumatic control port 42.1.

The first pneumatic control port 42.1 is connected in pressure-conducting fashion to the spring-type actuator port 18, such that the first control pressure pS1 is equivalent to a pressure provided at the spring-type actuator port 18. Here, the first pneumatically controlled switching valve 42 is configured as a pneumatically controlled 3/2 directional valve 44 which has a first port 44.1, a second port 44.2 and a third port 44.3. The first port 44.1 is connected in pressure-conducting fashion via a first redundancy branch 45.1 to the redundancy port 20, at which a redundancy pressure pR can be provided. The second port 44.2 is connected in pressure-conducting fashion to the supply port 10, which provides the supply pressure pV at the second port 44.2. The third port 44.3 is connected in pressure-conducting fashion to a redundancy valve 30 of the trailer control unit TCV. The pneumatically controllable 3/2 directional valve 44 is preloaded in spring-loaded fashion into the first switching position illustrated in FIG. 2. In the first switching position, the second port 44.2 is connected in pressure-conducting fashion to the third port 44.3, such that supply pressure pV is provided at the redundancy valve 30 of the trailer control unit TCV. If the first control pressure pS1 overshoots a first limit pressure pG1, then the first pneumatically controllable switching valve 42 switches into a second switching position and connects the redundancy port 20 in pressure-conducting fashion to the redundancy valve 30. The first limit pressure pG1 is higher than a pressure level prevailing at the vent 16, which in this case corresponds to an ambient pressure pU. If the spring-type actuator port 18 is ventilated through a pressure-conducting connection to the vent 16, then holding brakes of the vehicle 200 are engaged. At the same time, the first control pressure pS1 undershoots the first limit pressure pG1 and the first pneumatically controllable switching valve 42 switches to the first switching position, such that supply pressure pV is provided to the redundancy valve 30 via the supply port 10, the second port 44.2 and the third port 44.3. By contrast, if a supply pressure pV or a holding brake pressure pF1 that is higher than the first limit pressure pG1 is provided at the spring-type actuator port 18, then the spring-type actuators 242.1, 242.2 are at least partially pressurized, such that the spring-type actuators 242.1, 242.2 are at least partially released. At the same time, the pneumatically controlled switching valve 42 is switched to the second switching position, and the redundancy port 20 is connected to the redundancy valve 30 via the first port 44.1 and the third port 44.3 of the pneumatically controlled 3/2 directional valve 44.

A particular advantage of the described embodiment is that, if spring-type actuators 242.1, 242.2 are to be engaged by pressure-conducting connection of the spring-type actuator port 18 to the vent 16, supply pressure pV is automatically provided at the trailer control unit TCV. No expensive and bulky inverse relay valve is required for this purpose.

The redundancy valve 30 is assigned here to a trailer pilot control unit 29 of the trailer control unit TCV, which furthermore includes an inlet valve 32 and an outlet valve 33. Furthermore, the trailer control valve unit 2 has a second relay valve 34. The inlet valve 32 is configured as a 2/2 directional valve and has a first inlet valve port 32.1 and a second inlet valve port 32.2. The first inlet valve port 32.1 is connected to the supply port 10 via a first supply branch 35.1 of a first supply distribution line 35. The second inlet valve port 32.2 is connected to a first control line 36 of the trailer control unit TCV. The inlet valve 32 is configured to modulate a supply pressure pV, which is provided at the first inlet valve port 32.1, on the basis of a first valve control signal SV1 that is provided by the electronic control unit ECU. The inlet valve then provides a first control pressure pS1 at the second inlet valve port 32.2 and in the first control line 36. In the deenergized state, the inlet valve 32 is preloaded into a closed state.

A control inlet 34.1 of the second relay valve 34 is connected to the first control line 36. The second relay valve 34 furthermore has a working port 34.2, a supply port 34.3 and a ventilation port 34.4. Here, the ventilation port 34.4 is connected to the vent 16. The supply port 34.3 is connected to a second supply branch 35.2 of the supply pressure distribution line 35, and is configured to receive the supply pressure pV provided at the supply port 10. Furthermore, a third supply branch 35.3 of the supply pressure distribution line 35 connects the trailer feed pressure port 14 directly to the supply port 10 of the electropneumatic control module 1. If the second relay valve 34 receives the first control pressure pS1 at the control port 34.1, then the second relay valve outputs a brake pressure pB, which is proportional to the first control pressure pS1, at the working port 34.2, and provides the brake pressure to the trailer brake pressure port 12 via a trailer brake pressure line 37. It should be understood that the brake pressure pB may also be identical to the control pressure pS1. Likewise, provision may also be made for the brake pressure pB to be a multiple of the first control pressure pS1. Here, the trailer control unit TCV furthermore has a pressure sensor 38 which is connected to the electronic control unit ECU and which is configured to provide a pressure signal SD, which corresponds to the pressure in the trailer brake pressure line 37, to the electronic control unit ECU.

A first outlet valve port 33.1 of the outlet valve 33 is connected to the first control line 36. The outlet valve 33 is electrically switched, and can be switched from a closed switching state shown in FIG. 2 into an open switching state in response to receiving a second valve control signal SV2 that is provided by the electronic control unit ECU. In the open switching state, the outlet valve 33 connects the first control line 36 to the vent 16, wherein the first outlet valve port 33.1 is connected in pressure-conducting fashion to a second outlet valve port 33.2. In a deenergized state, the outlet valve 33 is preferably preloaded into the switching state shown in FIG. 2 and closed. If the outlet valve 33 is opened, the pressure in the first control line 36 and at the control port 34.1 of the second relay valve 34 drops to the ambient pressure pU of the vent 16. In this way, the second relay valve 34 is also switched into a ventilation position, such that the trailer brake pressure line 37 and the trailer brake pressure port 12 are ventilated via the ventilation port 34.4 of the second relay valve 34.

The second relay valve 34 is controlled purely pneumatically. If the inlet valve 32 and the outlet valve 33 are deenergized owing to a fault in the electronic control unit ECU and/or a fault in a voltage supply (not shown) of the electropneumatic control module 1, then these close automatically, such that no first control pressure pS1 is provided by the inlet valve 32 to the first control line 36. The redundancy valve 30, which in this case is likewise electrically switched, is open in a deenergized state shown in FIG. 2, such that a first redundancy valve port 30.1 is connected in pressure-conducting fashion to a second redundancy valve port 30.2. The second redundancy valve port 30.2 is in turn connected to the first control line 36. If the trailer pilot control unit 29 is deenergized, the inlet valve 32 and the outlet valve 33 are closed, whereas the redundancy valve 30 is open. Thus, a pressure provided at the first redundancy valve port 30.1 can be provided at the control port 34.1 of the second relay valve 34. It should be understood that the redundancy valve 30 may also be configured to modulate a pressure provided at the first redundancy valve port 30.1 on the basis of a corresponding third valve control signal SV3, and to provide a correspondingly modulated pressure at the second redundancy valve port 30.2.

The pressure that is provided at the first redundancy valve port 30.1 is determined by the parking brake valve unit 40, as discussed above. Depending on the switching position of the parking brake valve unit 40, either a redundancy pressure pR is provided to the redundancy valve 30 via the first port 44.1 and the third port 44.3 of the parking brake valve unit 40, or a supply pressure pV is provided to the redundancy valve 30 via the second port 44.2 and the third port 44.3. When the redundancy valve 30 is open, then the redundancy pressure pR is also provided at the control port 34.1 of the second relay valve 34. In the deenergized situation, and if the parking brake valve unit 40 is in a corresponding switching position, then a brake pressure pB that is proportional, particularly preferably equivalent, to the redundancy pressure pR is provided at the trailer brake pressure port 12. The corresponding switching position is present if, at the spring-type actuator port 18, a pressure pF1, pV is provided that is greater than the first limit pressure pG1 of the first pneumatic control port 42.1 of the first pneumatically controlled switching valve 42 of the parking brake valve unit 40. It is thus possible for a brake pressure pB that is proportional to the redundancy pressure pR to be output at the trailer brake pressure port 12 precisely when the spring-type actuators 242.1, 242.2 of the vehicle 200 are released. If the spring-type actuators 242.1, 242.2 of the vehicle 200 are ventilated, such that the vehicle 200 is braked, the pressure level of the vent 16, which corresponds here to the ambient pressure pU, prevails at the spring-type actuator port 18 and at the pneumatic control port 42.1. The first limit pressure pG1 of the pneumatically controlled switching valve 42 is higher than the ambient pressure pU, such that the switching valve 42 is switched into the switching position shown in FIG. 2. In the switching position shown, the second port 44.2 of the pneumatically controlled 3/2 directional valve 44 is connected in pressure-conducting fashion to the third port 44.3. Supply pressure pV can thus be provided at the first redundancy valve port 30.1 via the supply port 10, a fourth supply branch 35.4, the supply distribution line 35, the second and third ports 44.2, 44.3 of the first pneumatically controlled switching valve 42, and a redundancy line 39. If the redundancy valve 30 is open, then the supply pressure pV is provided via the first control line 36 to the control port 34.1 of the second relay valve 34, which then provides, at the working port 34.2 and thus also at the trailer brake pressure port 12, a brake pressure pB that is proportional to the supply pressure pV. It can advantageously be achieved in this way that, if the spring brakes of the vehicle 200 are engaged, that is, the spring-type accumulators are fully ventilated, a brake pressure pB that is proportional to the supply pressure pV, preferably a brake pressure pB that is equivalent to the supply pressure pV, is provided at the trailer brake pressure port 12. This functionality is implemented here without an expensive inverse relay valve. Furthermore, this is also possible when the electropneumatic control module 1 is deenergized, for example when the vehicle 200 is parked. It should be understood that the inlet valve 32 and the outlet valve 33 may also be closed on the basis of corresponding first and second valve control signals SV1, SV2. Likewise, the redundancy valve 30 may also be opened on the basis of the third valve control signal SV3 provided by the electronic control unit ECU. However, the redundancy valve 30 is preferably closed in normal operation, such that the brake pressure pB can be output solely via the first control pressure pS1 provided by the inlet valve 32.

The pressure pF1, pV, pU provided at the spring-type actuator port 18 is determined by the holding brake unit EPH. The holding brake unit EPH has a holding brake pilot control unit 4, which is formed here by an electropneumatic bistable valve 46 and a second parking brake valve 48 and which is configured to provide a pilot control pressure pVS. A first holding brake pilot control port 4.1 of the holding brake pilot control unit 4 is formed here by a first port 46.1 of the bistable valve 46. A third port 46.3 of the bistable valve 46 forms a third holding brake pilot control port 4.3. A second port 48.2 of the second holding brake valve 48 is in this case a second holding brake pilot control port 4.2, at which the pilot control pressure pVS is provided. A second port 46.2 of the bistable valve 46 is connected in pressure-conducting fashion to a first port 48.1 of the second holding brake valve 48. The second holding brake valve 48 is electropneumatically controlled and is preloaded into the open switching position illustrated in FIG. 2. The second holding brake valve 48 can be closed on the basis of fourth valve control signals SV4, which are provided by the electronic control unit ECU. The first port 46.1 of the bistable valve 46 and thus also the first holding brake pilot control port 4.1 are connected to the vent 16. The third port 46.3 of the bistable valve 46 and thus also the holding brake pilot control port 4.3 are connected via a fifth supply branch 35.5 to the supply port 10, such that supply pressure pV can be provided at the third holding brake pilot control port 4.3. The bistable valve 46 is configured as a conventional bistable 3/2 directional valve with two stable switching states, and can be switched between the two switching states on the basis of a fifth valve control signal SV5. In response to receiving an electronic holding signal S2, the electronic control unit ECU provides valve control signals SV4, SV5 and switches the holding brake pilot control unit 4. In the ventilation position 22 shown in FIG. 2, the first holding brake pilot control port 4.1 is connected in pressure-conducting fashion to the second holding brake pilot control port 4.2 and thus also to the vent 16. In the open position 24, the second holding brake valve 48 is open and a second port 46.2 of the bistable valve 46 is connected in pressure-conducting fashion to the third port 46.3. The supply pressure pV provided via the fifth supply branch 35.5 is thus provided by the third holding brake pilot control port 4.3 to the second holding brake pilot control port 4.2. The pilot control pressure pVS is thus output at the second holding brake pilot control port 4.2 in a manner dependent on the switching position 22, 24 of the holding brake pilot control unit 4. In the ventilation position 22, the pilot control pressure pVS corresponds to the pressure at the vent 16, which corresponds here to the ambient pressure pU. In the open position 24, the pilot control pressure pVS corresponds to the supply pressure pV.

The holding brake unit EPH furthermore has a shuttle valve 50, which is configured here as a double check valve 52. A first shuttle valve port 50.1 of the shuttle valve 50 is connected via a second redundancy branch 45.2 to the redundancy port 20. Furthermore, the shuttle valve 50 has a second shuttle valve port 50.2 and a third shuttle valve port 50.3. A pilot control line 54 connects the second holding brake pilot control port 4.2 to the second shuttle valve port 50.2. It is thus possible for the redundancy pressure pR to be provided at the first shuttle valve port 50.1 and for the pilot control pressure pVS to be provided at the second shuttle valve port 50.2. The shuttle valve 50 performs a selection function here, which is also referred to as a select-high function, wherein always the respectively higher of the pressures provided at the first and second shuttle valve ports 50.1, 50.2 is provided at the third shuttle valve port 50.3. The third shuttle valve port 50.3 is connected to the control port 60.1 of a first relay valve 60 of the holding brake unit EPH. The first relay valve 60 is configured to output, at a working port 60.2, a pressure that is proportional to the pressure prevailing at the control port 60.1. For this purpose, the first relay valve 60 modulates the supply pressure pV that is provided at a feed port 60.3 via a sixth supply branch 35.6. If the control port 60.1 of the first relay valve 60 is connected to the vent 16, then the working port 60.2 is ventilated via a ventilation port 60.4. A check valve 56 is preferably arranged in the sixth supply branch 35.6, which check valve prevents fluid from flowing back from the feed port 60.3 to the supply port 10. A spring-type actuator line 58 connects the working port 60.2 of the first relay valve 60 to the spring-type actuator port 18. For corresponding closed-loop pressure control, a second pressure sensor 59 is provided for the holding brake unit EPH, which second pressure sensor is connected to the spring-type actuator line 58 and provides a corresponding second pressure signal SD2 to the control unit ECU.

The holding brake pilot control unit 4 and the shuttle valve 50 determine the pressure that is provided at the working port 60.2 of the first relay valve 60 and thus also at the spring-type actuator port 18. For this purpose, it is first of all decisive whether a redundancy pressure pR is provided at the first shuttle valve port 50.1 via the redundancy port 20 and the second redundancy pressure distribution line 45.2. If this is not the case, the pressure output at the spring-type actuator port 18 is determined by the holding brake pilot control unit 4. If the holding brake pilot control unit 4 is situated in the ventilation position 22, then the ambient pressure pU is output at the spring-type actuator port 18, and spring-type actuators connected to the spring-type actuator port 18 are ventilated. If the holding brake pilot control unit 4 is situated in an open position 24, then the supply pressure pV is provided at the control port 60.1 of the first relay valve 60 via the second holding brake pilot control port 4.2, the pilot control line 54, the second shuttle valve port 50.2 and the third shuttle valve port 50.3. The first relay valve 60 then outputs the supply pressure pV, or a second holding brake pressure pF2 proportional to the supply pressure pV, at the working port 60.2 and thus at the spring-type actuator port 18.

By contrast, if a redundancy pressure pR is provided at the redundancy port 20, then this prevails directly at the first shuttle valve port 50.1 owing to the direct connection via the second redundancy pressure distribution line 45.2. If the holding brake pilot control unit 4 is situated in the ventilation position, the ambient pressure pU is provided at the second shuttle valve port 50.2. The shuttle valve 50 provides the higher pressure, that is, in this case the redundancy pressure pR, at the third shuttle valve port 50.3 and thus also at the control port 60.1 of the first relay valve 60. The first relay valve 60 then provides a first holding brake pressure pF1 at the working port 60.2 and at the spring-type actuator port 18 that is connected to the working port by the spring-type actuator line 58. The holding brake pressure pF1 preferably corresponds to the redundancy pressure pR. As a result, spring-type actuators 242.1, 242.2 of the vehicle 200 that are connected to the spring-type actuator port 18 are at least partially pressurized. If the redundancy pressure pR is also provided at service brake cylinders 216 of the vehicle 200, simultaneous actuation of an actuating unit (not illustrated) and/or of a wheel brake (not illustrated) by spring-type actuator 242 and service brake cylinder 216 can thus be avoided, and an overload protection function can be implemented.

By contrast, if the holding brake pilot control unit 4 is situated in an open position, then the first pilot control pressure pVS prevails at the second shuttle valve port 50.2. If the bistable valve 46 and the second holding brake valve 48 are fully open, then the first pilot control pressure pVS corresponds to the supply pressure pV. Since the supply pressure pV is higher than the redundancy pressure pR, the supply pressure is provided by the shuttle valve 50 to the control port 60.1 of the first relay valve 60. Consequently, a pressure proportional to the supply pressure pV is provided at the spring-type actuator port 18. This preferably corresponds to the supply pressure pV.

The second holding brake valve 48 is preferably configured to modulate a pressure provided at the second port 46.2 of the bistable valve 46, and to provide the pressure at the second port 48.2 of the second holding brake valve 48. The pilot control pressure pVS can thus be modulated via the second holding brake valve 48. This is particularly advantageous if no redundancy pressure pR is provided at the first shuttle valve port 50.1. As already discussed, the holding brake unit EPH then provides a second holding brake pressure pF2, which is proportional to the first pilot control pressure pVS, at the spring-type actuator port 18. By modulation of the pressure pVS, spring brakes 242.1, 242.2 of the vehicle 200 that are connected to the spring-type actuator port 18 can thus be used as redundancy brakes or auxiliary brakes. However, provision may also be made for the holding brake pilot control unit 4 to be implemented without a second holding brake valve 48. For example, the second holding brake pilot control port 4.2 may then be formed by the second port 46.2 of the bistable valve 46.

According to this embodiment, both the trailer control unit TCV and the holding brake unit EPH are actuated by the electronic control module ECU. However, provision may also be made for the trailer control unit TCV and the holding brake unit EPH to have respectively dedicated electronic control units. This may be preferable in order to ensure at least the functionality of one subsystem in the event of a failure of the respective other electronic control unit. However, costs can preferably be saved through the use of one common electronic control unit ECU.

Here, the electropneumatic control module 1 has in each case only one supply port 10 and one redundancy port 20, which in the electropneumatic control module 1 are connected to the valves via corresponding supply branches 35.1, 35.2, 35.3, 35.4, 35.5, 35.6 and redundancy branches 45.1, 45.2. In this way, a very simple construction of the electropneumatic control module 1 can be implemented. Furthermore, assembly errors during the installation of the electropneumatic control module 1 into a brake system are avoided. Furthermore, simplified and inexpensive line routing can be achieved in a brake system 204 that has an electropneumatic control module 1 according to the disclosure.

Figure 3:
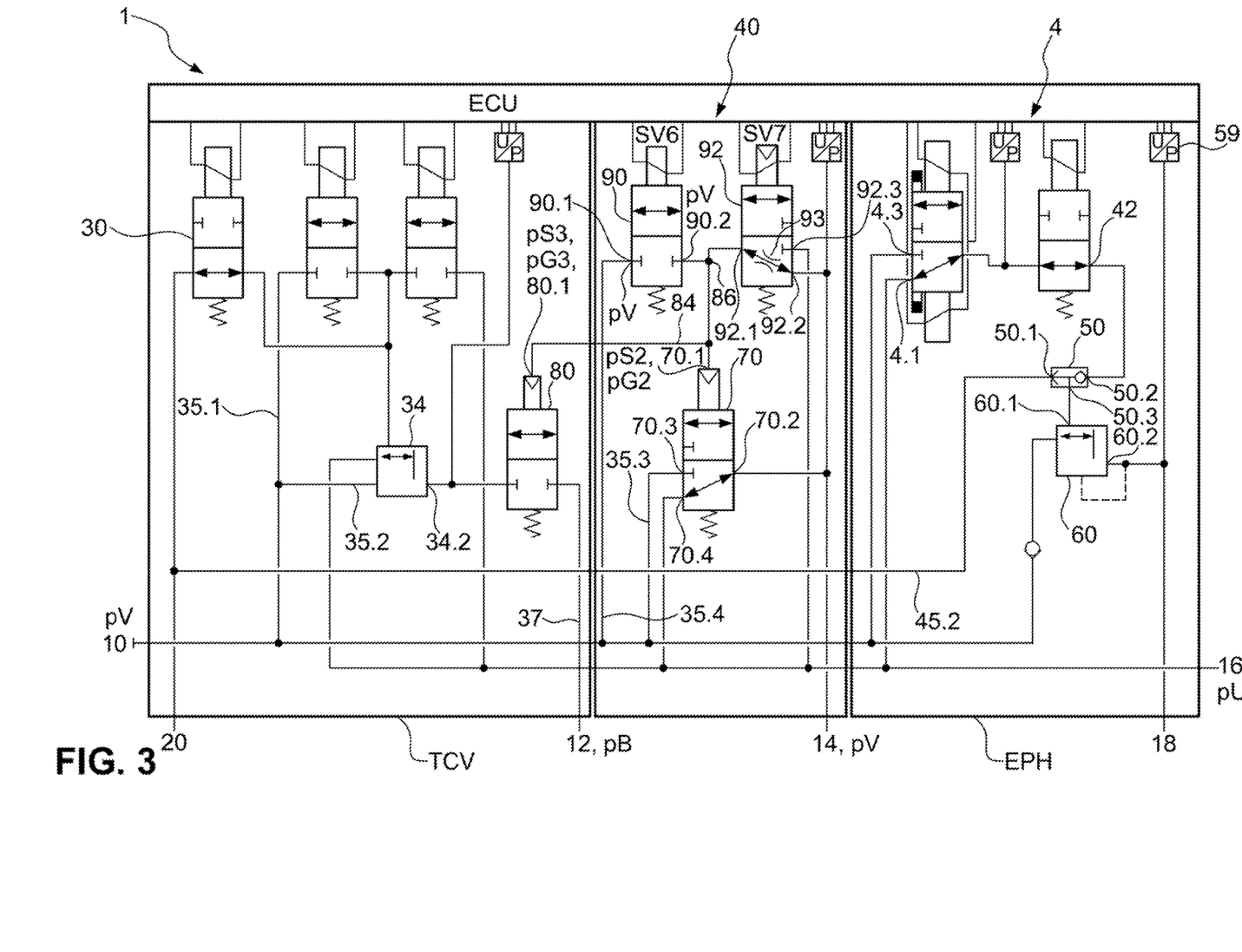

FIG. 3 illustrates a second embodiment of an electropneumatic control module 1. The holding brake unit EPH is of substantially analogous configuration to the holding brake unit EPH according to the first embodiment, for which reason reference is made here to the above description relating to the first embodiment in its entirety. In addition to the second pressure sensor 59, the holding brake unit EPH according to the second embodiment also has a third pressure sensor 62. It should be understood that the holding brake unit EPH according to the first embodiment (FIG. 2) may also have a third pressure sensor 62.

The trailer control unit TCV according to the second embodiment is also of substantially analogous configuration to the trailer control unit TCV according to the first embodiment. Here, however, the first redundancy valve port 30.1 of the redundancy valve 30 is connected to the redundancy port 20 via the first redundancy branch 45.1. The functioning of the inlet valve 32, of the outlet valve 33 and of the second relay valve 34 is substantially analogous to the first embodiment in this case. In the second embodiment, a third pneumatic switching valve 80 is also provided between the working port 34.2 and the trailer brake pressure line 37, which third pneumatic switching valve is configured to pass a brake pressure pB provided at the working port 34.2 of the second relay valve 34 through to the trailer brake pressure port 12 only when a third control pressure pS3 overshoots a third limit pressure pG3 of the third pneumatic switching valve 80. In an unpressurized state, the third pneumatic switching valve 80 is preloaded into a closed state shown in FIG. 3. A third control line 86 connects a third pneumatic control port 80.1 of the third pneumatic switching valve 80 to a second control port 70.1 of a second pneumatic switching valve 70 of the parking brake valve unit 40. A second pneumatic control pressure pS2 for controlling the second pneumatic switching valve 70 and the third pneumatic control pressure pS3 are therefore identical. If the second pneumatic control pressure pS2 overshoots a second limit pressure pG2 of the second pneumatic control valve 70, then the second pneumatic switching valve 70 is switched from the first switching position illustrated in FIG. 3 into a second switching position. The second pneumatic switching valve 70 is preferably preloaded into the first switching position. The second pneumatic switching valve 70 is arranged between the third supply branch 35.3 and the trailer feed port 14. Here, the third supply branch 35.3 is connected to a third port 70.3 of the second pneumatic control valve 70. A second port 70.2 of the second pneumatic switching valve 70 is connected in pressure-conducting fashion to the trailer feed port 14. If the second pneumatic switching valve 70 is situated in the second switching position, then the third port 70.3 and the second port 70.2 are connected, and supply pressure pV is provided at the trailer feed port 14. By contrast, in the first switching position of the second pneumatic switching valve 70, the trailer feed port 14 is connected via a fourth port 70.4 to the vent 16.

To provide the second and third control pressure pS2, pS3, the parking brake valve unit 40 has a first parking brake valve 90 and a second parking brake valve 92. Both the first parking brake valve 90 and the second parking brake valve 92 are configured here as electrically switchable valves. The first parking brake valve 90 is an electrically switchable 2/2 directional valve. The fourth supply branch 35.4 connects a first port 90.1 of the first parking brake valve 90 to the supply inlet 10. The electronic control unit ECU is configured to provide sixth valve control signals SV6 at the first parking brake valve 90, wherein the first parking brake valve 90 is opened and provides the supply pressure pV2 at the second port 90.2. A second control line 84 connects the second port 90.2 of the first parking brake valve 90 to a first port 92.1 of the second parking brake valve 92 and to the third control line 86. A second port 92.2 of the second parking brake valve 92 is connected to the trailer feed port 14. Furthermore, a third port 92.3 of the second parking brake valve 92 is connected to the vent 16. If the second parking brake valve 92 is switched from a first switching state to a second switching state on the basis of seventh valve control signals SV7 that are provided by the electronic control unit ECU, then the second control line 84 and the third control line 86 are connected to the vent 16. As a result, the second control pressure pS2 falls below the second limit pressure pG2, and the second pneumatic control valve 70 switches into the first switching state, wherein the trailer feed port 14 is connected in pressure-conducting fashion to the vent 16. Furthermore, the third control pressure pS3 also falls below the third limit pressure pG3, such that the third pneumatic control valve 80 is closed, wherein no brake pressure pB is output at the trailer brake pressure port 12.

In a first switching state of the second switching valve 92, the first port 92.1 and the second port 92.2 are connected via a throttle 93. Here, the second parking brake valve 92 is preloaded into the first switching state. The throttle 93 in this case allows only a comparatively slow pressure equalization between the first port 92.1 and the second port 92.2 of the second parking brake valve 92. If a brake pressure pB is to be provided at the trailer brake pressure port 12 and a supply pressure pV is to be provided at the trailer feed pressure port 14, the first parking brake valve 90 is switched into the second switching state and the supply pressure pV is output at the second port 90.2 of the first parking brake valve 90. Since the throttle 93 of the second parking brake valve 92 allows only a slow pressure equalization, the pressure in the second and third control lines 84, 86 increases. As soon as the second control pressure pS2 overshoots the second limit pressure pG2, the second pneumatic switching valve 70 switches into the second switching state and connects the supply port 10 in pressure-conducting fashion to the trailer feed pressure port 14. Since the supply pressure pV is now provided both at the first port 92.1 and at the second port 92.2 of the second parking brake valve 92, the pressure in the second and third control lines 84, 86 stabilizes at the level of the supply pressure pV. As soon as the third control pressure pS3 overshoots the third limit pressure pG3, the third pneumatic switching valve 80 is opened, such that a brake pressure pB can be output at the trailer brake pressure port 12 via the second relay valve 34.

A major function of the parking brake valve unit 40 according to the second embodiment includes protecting a pressure level in the electropneumatic control module 1 and in the electronically controllable brake system 204 in the event of a leak in a brake system of the trailer (not illustrated) or in the event of a sudden disconnection of the trailer from the trailer feed pressure port 14. In such a situation, the trailer feed pressure port 14 is rapidly ventilated. If, in such a situation, the second pneumatic switching valve 70 were to remain in the first switching position, then the compressed air supply 250 connected to the supply port would be evacuated. This is avoided by way of the described arrangement of the first parking brake valve 90, of the second parking brake valve 92, of the second pneumatic switching valve 70 and of the third pneumatic switching valve 80. If the trailer feed port 14 is ventilated, then the pressure of the second port 92.2, which is connected thereto, of the second parking brake valve 92 falls to the level of the ambient pressure pU. Since the first port 92.1 and the second port 92.2 of the second parking brake valve 92 are connected via the throttle 93, the pressure in the second and third control lines 84, 86 also falls. As soon as the second control pressure pS2 undershoots the second limit pressure pG2, the second pneumatic switching valve is switched to the first switching position illustrated in FIG. 3, and a pressure-conducting connection of the trailer feed pressure port 14 to the supply port 10 is interrupted. Furthermore, a pressure-conducting connection of the working port 34.2 of the second relay valve 34 to the trailer brake pressure port 12 is prevented as soon as the third control pressure pS3 undershoots the third limit pressure pG3.

It is understood that the foregoing description is that of the preferred embodiments of the invention and that various changes and modifications may be made thereto without departing from the spirit and scope of the invention as defined in the appended claims.

LIST OF REFERENCE DESIGNATIONS (PART OF THE DESCRIPTION)

1 Electropneumatic control module
2 Trailer control valve unit
4 Holding brake pilot control unit
4.1 First holding brake pilot control port
4.2 Second holding brake pilot control port
4.3 Third holding brake pilot control port
6 Electropneumatic valves of the trailer control valve unit
8 Electropneumatic valves of the holding brake pilot control unit
10 Supply port
12 Trailer brake pressure port
14 Trailer feed pressure port
16 Vent
18 Spring-type actuator port
20 Redundancy port
22 Ventilation position
24 Open position
26 Housing
29 Trailer pilot control unit
30 Redundancy valve
30.1 First redundancy valve port
30.2 Second redundancy valve port
32 Inlet valve
32.1 First inlet valve port
32.2 Second inlet valve port
33 Outlet valve
33.1 First outlet valve port
33.2 Second outlet valve port
34 Second relay valve
34.1 Control inlet of second relay valve
34.2 Working port of second relay valve
34.3 Feed port of second relay valve

| | |
|---|---|
| 34.4 Ventilation port of second relay valve | 216.1, 216.2 Rear axle service brake cylinder |
| 35 Supply distribution line | 218 Central control unit |
| 35.1, 35.2, 35.3, 35.4, | 220 Front wheels |
| 35.5, 35.6 First to sixth supply branches | 220.1 Right front wheel |
| 36 First control line | 220.2 Left front wheel |
| 37 Trailer brake pressure line | 222.1, 222.2 ABS modules |
| 38 Pressure sensor | 224.1, 224.2, 224.3, |
| 39 Redundancy line | 224.4 Wheel rotational speed sensors |
| 40 Parking brake valve unit | 226 Brake signal transmitter |
| 42 First pneumatically controlled switching valve | 228 First compressed air supply |
| 42.1 First pneumatic control port | 230 Partially electric brake signal transmitter |
| 44 Pneumatically controlled 3/2 directional valve | 232 Rear wheels |
| 44.1 First port | 232.1 Right rear wheels |
| 44.2 Second port | 232.2 Left rear wheels |
| 44.3 Third port | 234.1, 234.2, 234.3, |
| 44.4 Spring | 234.4 Signal lines |
| 45.1 First redundancy branch | 236 Combined module |
| 45.2 Second redundancy branch | 238.1, 238.2 Control lines |
| 46 Bistable valve | 240 Second compressed air supply |
| 46.1 First port of bistable valve | 242.1, 242.2 Spring-type actuator |
| 46.2 Second port of bistable valve | 244.1, 244.2 Double-acting brake cylinders |
| 46.3 Third port of bistable valve | 246 Parking brake switch |
| 48 Second holding brake valve | 248 Electronic switch |
| 50 Shuttle valve | 250 Third compressed air supply |
| 50.1 First shuttle valve port | BV Braking specification |
| 50.2 Second shuttle valve port | ECU Electronic control unit |
| 50.3 Third shuttle valve port | EPH Holding brake unit |
| 52 Double check valve | pB Brake pressure |
| 54 Pilot control line | pBH Rear axle brake pressure |
| 56 Check valve | pBV Front axle brake pressure |
| 58 Spring-type actuator line | pF1, pF2 Holding brake pressures |
| 59 Second pressure sensor | pG1, pG2, pG3 Limit pressures |
| 60 First relay valve | pR Redundancy pressure |
| 60.1 Control port of first relay valve | pSV Front axle control pressure |
| 60.2 Working port of first relay valve | pS1 First control pressure |
| 60.3 Feed port of first relay valve | pU Ambient pressure |
| 60.4 Ventilation port of first relay valve | pV Supply pressure |
| 62 Third pressure sensor | pVS Pilot control pressure |
| 70 Second pneumatic switching valve | SD Pressure signal |
| 70.1 Second pneumatic control port | SD2 Second pressure signal |
| 70.2 Second port of second pneumatic switching valve | SV1, SV2, SV3, SV4, |
| 70.3 Third port of second pneumatic switching valve | SV5, SV6, SV7 First to seventh valve control signal |
| 70.4 Fourth port of second pneumatic switching valve | S1.1, S1.2 Control signals |
| 80 Third pneumatic switching valve | S2 Electronic holding signal |
| 80.1 Third control port | S3.1, S3.2 ABS signals |
| 84 Second control line | TCV Trailer control unit |
| 86 Third control line | |
| 90 First parking brake valve | What is claimed is: |
| 90.1 First port of first parking brake valve | 1. An electropneumatic control module for an electronically controllable pneumatic brake system of a vehicle |
| 90.2 Second port of first parking brake valve | |
| 92 Second parking brake valve | |
| 92.1 First port of second parking brake valve | |
| 92.2 Second port of second parking brake valve | |
| 92.3 Third port of second parking brake valve | |
| 93 Throttle | |
| 200 Vehicle | |
| 202 Utility vehicle | |
| 204 Electronically controllable pneumatic brake system | |
| 206 Front axle brake circuit | |
| 208 Rear axle brake circuit | |
| 209 Trailer brake circuit | |
| 210 Front axle modulator | |
| 211 Parking brake circuit | |
| 212 Rear axle modulator | |
| 214 Front axle service brake cylinder | |
| 214.1 First front axle service brake cylinder | |
| 214.2 Second front axle service brake cylinder | |

What is claimed is:

1. An electropneumatic control module for an electronically controllable pneumatic brake system of a vehicle including a utility vehicle, the vehicle having at least one spring-type actuator and the electronically controllable pneumatic brake system including a compressed air supply and said electropneumatic control module comprising:

a pneumatic supply port connectable to said compressed air supply for receiving a supply pressure (pV);

a trailer control unit (TCV) including a trailer control valve unit having at least one electropneumatic valve, a trailer brake pressure port and a trailer feed pressure port;

a holding brake unit (EPH) having a spring-type actuator port for said at least one spring-type actuator and having a holding brake pilot control unit with at least one electropneumatic valve;

a first vent;

said holding brake pilot control unit having a first holding brake pilot control port connected to said first vent;

said holding brake pilot control unit further having a second holding brake pilot control port;

an electronic control unit (ECU) configured to cause said holding brake unit (EPH) to switch said holding brake pilot control unit into a ventilation position in response to receipt of an electronic holding signal (S2) and, in said ventilation position, said second holding brake pilot control port being connected in pressure-conducting manner to said first holding brake pilot control port and said spring-type actuator port being connectable to said first vent or a second vent;

said holding brake unit (EPH) being connected in a pressure-conducting manner to a redundancy port and is configured to, in lieu of a connection of said spring-type actuator port to said first vent, output a first holding brake pressure (pF1) at said spring-type actuator port when said holding brake pilot control unit is in said ventilation position and a redundancy pressure (pR) is provided at said redundancy port; and, said trailer control unit (TCV) being configured to output a brake pressure (pB) at said trailer brake pressure port when said redundancy pressure (pR) is provided at said redundancy port.

2. The electropneumatic control module of claim 1, wherein said holding brake unit (EPH) is configured to output the first holding brake pressure (pF1) only when said holding brake pilot control unit is in said ventilation position and to output said supply pressure (pV) when said holding brake pilot control unit is switched into an open position.

3. The electropneumatic control module of claim 1, wherein the spring-type actuator port is connected to said first vent when no redundancy pressure (pR) is provided at said redundancy port and said holding brake pilot control unit is in said ventilation position.

4. The electropneumatic control module of claim 1, wherein:
said holding brake unit (EPH) further comprises a shuttle valve having a first shuttle valve port, a second shuttle valve port and a third shuttle valve port;
said first shuttle valve port is connected to said redundancy port for receiving said redundancy pressure (pR);
said second shuttle valve port is connected to said holding brake pilot control unit for receiving a pilot control pressure (pVS); and,
said shuttle valve is configured to provide in each case the higher out of said redundancy pressure (pR) and said pilot control pressure (pVS) at said third shuttle valve port.

5. The electropneumatic control module of claim 4, wherein said holding brake unit (EPH) further has a first relay valve having a control port connected to said third shuttle valve port and has a working port connected to said spring-type actuator port.

6. The electropneumatic control module of claim 1, further comprising a parking brake valve unit having a first pneumatically controlled switching valve having a first pneumatic control port for receiving a first pneumatic control pressure (pS1); and, wherein, when said spring-type actuator port is connected to said first vent, said pneumatically controlled switching valve is so switched that the supply pressure (pV) can be output at said trailer brake pressure port.

7. The electropneumatic control module of claim 6, wherein said first pneumatic control pressure (pS1) is the pressure at the spring-type actuator port.

8. The electropneumatic control module of claim 6, wherein said pneumatically controlled switching valve is configured as a pneumatically controlled 3/2 directional valve with a first port, a second port and a third port.

9. The electropneumatic control module of claim 8, wherein said first port of the pneumatically controlled 3/2 directional valve is connected to said redundancy port and said second port of said pneumatically controlled 3/2 directional valve is connected to said pneumatic supply port.

10. The electropneumatic control module of claim 9, wherein said third port of the pneumatically controlled 3/2 directional valve is connected to a redundancy valve of said trailer control valve unit of said trailer control unit (TCV).

11. The electropneumatic control module of claim 1, wherein said trailer control valve unit of said trailer control unit (TCV) has a redundancy valve; and, said redundancy port is pneumatically connected to a first redundancy valve port.

12. The electropneumatic control module of claim 11, further comprising a parking brake valve unit, wherein said electronic control unit (ECU) is configured to cause said parking brake valve unit, on the basis of an electronic holding signal, to switch at least one valve of the parking brake valve unit so as to cause a pneumatic connection between said trailer feed pressure port and said supply port to be interrupted.

13. The electropneumatic control module of claim 12, wherein the parking brake valve unit has a second pneumatically controlled switching valve having a second pneumatic control port for receiving a second pneumatic control pressure (pS2); and, when said second control pressure (pS2) undershoots a second limit pressure (pG2), said second pneumatically controlled switching valve is switched such that the pneumatic connection between said trailer feed pressure port and said supply port is interrupted.

14. The electropneumatic control module of claim 13, wherein said second pneumatically controlled switching valve is configured as a pneumatically controlled 3/2 directional valve with a second port, a third port and a fourth port; said second port is connected to said trailer feed pressure port; said third port is connected to said supply port; and, said fourth port is connected to said first vent or said second vent.

15. The electropneumatic control module of claim 13, wherein said trailer control unit (TCV) has a third pneumatically controlled switching valve having a third pneumatic control port for receiving a third pneumatic control pressure (pS3); and, said third pneumatic control port of said third pneumatically controlled switching valve is connected in pressure-conducting manner to said second pneumatic control port of the second pneumatic switching valve.

16. The electropneumatic control module of claim 15, wherein said third pneumatically controlled switching valve is configured to provide a trailer control pressure at said trailer brake pressure port when said third control pressure (pS3) overshoots a third limit pressure (pG3).

17. The electropneumatic control module of claim 1, wherein said electronic control unit (ECU), said trailer control unit (TCV) and said holding brake unit (EPH) are integrated in one module.

18. The electropneumatic control module of claim 17, further comprising a common housing wherein at least the components of the electronic control unit (ECU), the trailer control unit (TCV) and the holding brake unit (EPH) are arranged.

19. An electronically controllable pneumatic brake system for a vehicle including a utility vehicle, the electronically controllable pneumatic brake system comprising:

a front axle brake circuit for a front axle (VA) of the vehicle;
said front axle brake circuit including a front axle modulator and front axle service brake cylinders;
a rear axle brake circuit for at least one rear axle (HA) of the vehicle;
said rear axle brake circuit including a rear axle modulator and rear axle service brake cylinders;
a trailer brake circuit;
a central control unit configured to provide at least one control signal (S1.1, S1.2) to at least one of said rear axle modulator and said front axle modulator; and,
an electropneumatic control module including:
a pneumatic supply port connectable to a compressed air supply for receiving a supply pressure (pV);
a trailer control unit (TCV) including a trailer control valve unit having at least one electropneumatic valve, a trailer brake pressure port and a trailer feed pressure port;
a holding brake unit (EPH) having a spring-type actuator port for at least one spring-type actuator and having a holding brake pilot control unit with at least one electropneumatic valve;
a first vent;
said holding brake pilot control unit having a first holding brake pilot control port connected to said first vent;
said holding brake pilot control unit further having a second holding brake pilot control port;
an electronic control unit (ECU) configured to cause said holding brake unit (EPH) to switch said holding brake pilot control unit into a ventilation position in response to receipt of an electronic holding signal (S2) and, in said ventilation position, said second holding brake pilot control port being connected in pressure-conducting manner to said first holding brake pilot control port and said spring-type actuator port being connectable to said first vent or a second vent;
said holding brake unit (EPH) being connected in a pressure-conducting manner to a redundancy port and is configured to, in lieu of a connection of said spring-type actuator port to said first vent, output a first holding brake pressure (pF1) at said spring actuator port when said holding brake pilot control unit is in said ventilation position and a redundancy pressure (pR) is provided at said redundancy port; and,
said trailer control unit (TCV) being configured to output a brake pressure (pB) at said trailer brake pressure port when said redundancy pressure (pR) is provided at said redundancy port.

20. The electronically controllable pneumatic brake system of claim 19, wherein said redundancy port of said electropneumatic control module is pneumatically connected to at least one of said front axle modulator, said rear axle modulator and a manually actuatable brake signal transmitter.

21. The electronically controllable pneumatic brake system of claim 19, wherein said redundancy pressure (pR) is a front axle brake pressure (pVA) that is provided by said front axle modulator for the purposes of braking front wheels of the front axle (VA).

22. The electronically controllable pneumatic brake system of claim 19, wherein said redundancy pressure (pR) is a front axle control pressure (pSVA) that is provided by the brake signal transmitter to the front axle modulator.

23. A vehicle including a utility vehicle, the vehicle comprising:
an electronically controllable pneumatic brake system including:
a front axle brake circuit for a front axle (VA) of the vehicle;
said front axle brake circuit including a front axle modulator and front axle service brake cylinders;
a rear axle brake circuit for at least one rear axle (HA) of the vehicle;
said rear axle brake circuit including a rear axle modulator and rear axle service brake cylinders;
a trailer brake circuit;
a central control unit configured to provide at least one control signal (S1.1, S1.2) to at least one of said rear axle modulator and said front axle modulator; and,
an electropneumatic control module including:
a pneumatic supply port connectable to a compressed air supply for receiving a supply pressure (pV);
a trailer control unit (TCV) including a trailer control valve unit having at least one electropneumatic valve, a trailer brake pressure port and a trailer feed pressure port;
a holding brake unit (EPH) having a spring-type actuator port for at least one spring-type actuator and having a holding brake pilot control unit with at least one electropneumatic valve;
a first vent;
said holding brake pilot control unit having a first holding brake pilot control port connected to said first vent;
said holding brake pilot control unit further having a second holding brake pilot control port;
an electronic control unit (ECU) configured to cause said holding brake unit (EPH) to switch said holding brake pilot control unit into a ventilation position in response to receipt of an electronic holding signal (S2) and, in said ventilation position, said second holding brake pilot control port being connected in pressure-conducting manner to said first holding brake pilot control port and said spring-type actuator port being connectable to said first vent or a second vent;
said holding brake unit (EPH) being connected in a pressure-conducting manner to a redundancy port and is configured to, in lieu of a connection of said spring-type actuator port to said first vent, output a first holding brake pressure (pF1) at said spring actuator port when said holding brake pilot control unit is in said ventilation position and a redundancy pressure (pR) is provided at said redundancy port; and,
said trailer control unit (TCV) being configured to output a brake pressure (pB) at said trailer brake pressure port when said redundancy pressure (pR) is provided at said redundancy port.

* * * * *